(12) United States Patent
Riedle et al.

(10) Patent No.: US 9,280,432 B2
(45) Date of Patent: Mar. 8, 2016

(54) PROVIDING DATA INTEGRITY IN A NON-RELIABLE STORAGE BEHAVIOR

(71) Applicant: NetApp, Inc., Sunnyvale, CA (US)

(72) Inventors: Linda A. Riedle, Cary, NC (US); Fani Jenkins, Sunnyvale, CA (US); Bhoovaraghan Subramanian, Cary, NC (US); Sandeep T. Nirmale, Santa Clara, CA (US); Deepan Natesan Seeralan, Morrisville, NC (US); Yong E. Cho, Saratoga, CA (US)

(73) Assignee: NetApp, Inc., Sunnyvale, CA (US)

( * ) Notice: Subject to any disclaimer, the term of this patent is extended or adjusted under 35 U.S.C. 154(b) by 109 days.

(21) Appl. No.: 14/222,432

(22) Filed: Mar. 21, 2014

(65) Prior Publication Data

US 2015/0269045 A1    Sep. 24, 2015

(51) Int. Cl.
*G06F 11/00* (2006.01)
*G06F 11/20* (2006.01)

(52) U.S. Cl.
CPC .......... *G06F 11/2094* (2013.01); *G06F 11/203* (2013.01); *G06F 11/2023* (2013.01); *G06F 11/2043* (2013.01)

(58) Field of Classification Search
CPC ............ G06F 11/2023; G06F 11/2033; G06F 11/2043; G06F 11/1474; G06F 11/203
See application file for complete search history.

(56) References Cited

U.S. PATENT DOCUMENTS

| | | | |
|---|---|---|---|
| 7,085,962 B1 * | 8/2006 | Hamilton | ............ G06F 11/1458 711/162 |
| 7,627,614 B2 | 12/2009 | Hu et al. | |
| 7,730,153 B1 | 6/2010 | Gole et al. | |
| 7,966,294 B1 | 6/2011 | Gupta et al. | |
| 7,979,517 B1 | 7/2011 | Wang et al. | |
| 8,065,442 B1 | 11/2011 | Chatterjee et al. | |
| 8,069,366 B1 * | 11/2011 | Wenzel | ................. H04L 41/069 711/147 |
| 8,498,967 B1 | 7/2013 | Chatterjee et al. | |
| 8,554,867 B1 | 10/2013 | Mueller et al. | |
| 2006/0080568 A1 * | 4/2006 | Subbaraman | ....... G06F 11/2023 714/47.3 |
| 2008/0052327 A1 * | 2/2008 | Buah | ................... G06F 11/1482 |
| 2013/0205162 A1 * | 8/2013 | Hirose | ................ G06F 11/2023 714/4.11 |
| 2014/0047263 A1 * | 2/2014 | Coatney | ............. G06F 11/2023 714/4.11 |
| 2014/0359340 A1 * | 12/2014 | Hua | .................... G06F 11/2023 714/4.11 |

* cited by examiner

*Primary Examiner* — Yolanda L Wilson
(74) *Attorney, Agent, or Firm* — Cooper Legal Group, LLC

(57) ABSTRACT

In one aspect of the disclosure, progress identifiers (e.g., a plurality of flags) and/or generation numbers are utilized to determine a "correct" non-volatile random access memory (NVRAM) replay source to use during a retried switchover or early switchback. Initially, a switchover sequence is initiated. The switchover sequence includes a replay of logged information to storage devices of an aggregate to ensure data consistency of the aggregate. Progress of the switchover sequence is tracked using the progress identifiers and/or generation numbers. After an interruption during the switchover sequence, switchover is retried or an early switchback is performed. The retried switchover or early switchback decides whether to replay logged information, and, if so, determines an NVRAM replay source to replay logged information from based on states of the progress identifiers and/or comparison of the generation numbers.

20 Claims, 9 Drawing Sheets

PROVIDING DATA INTEGRITY IN A NON-RELIABLE STORAGE BEHAVIOR

BACKGROUND

1. Technical Field

The present disclosure relates to storage environments and, more specifically, to switchover between nodes of clusters of a peered cluster storage environment.

2. Background Information

A storage system typically includes one or more storage devices, such as disks, into which data may be entered, and from which data may be obtained, as desired. The storage system may logically organize the data stored on the storage devices as storage containers, such as files, directories, logical units (luns), etc. The data may be accessed via nodes of the storage system which provide storage services to clients. Certain nodes may be interconnected as a cluster, and configured to provide redundancy within the cluster, such that when one node of the cluster fails another node of the cluster may perform a takeover and service operations (e.g., service data access requests) directed to the failed node's storage containers. Likewise, clusters themselves may be peered to provide further redundancy, such that when one cluster fails another cluster may perform a switchover and its nodes may service operations (e.g., service data access requests) directed to the failed cluster's storage containers.

However, sometimes a switchover may be interrupted, for example, due to a reboot or panic during a switchover. Upon resumption of normal operation (e.g., on reboot or clearing of the panic), a node may desire to complete the switchover sequence or perform an early switchback (i.e. an operation where the interrupted switchover is aborted and any storage devices that may have been switched over are switched back their original owners), yet may have difficulty determining how far the prior switchover progressed before the interruption, and from which of a plurality of potential sources to replay logged operations (e.g., data access requests) to ensure consistency. This issue may be exacerbated by the potential for storage devices to become temporarily inaccessible during a switchover, or in the interim between an interrupted switchover and a retried switchover or early switchback. With existing techniques, a node may have little indication of which potential source to utilize to replay logged operations (e.g., data access requests) in response to a particular interruption (e.g., error) scenario.

BRIEF DESCRIPTION OF THE DRAWINGS

The description herein may be understood by referring to the following description in conjunction with the accompanying drawings in which like reference numerals generally indicate identical or functionally similar elements, of which.

DETAILED DESCRIPTION

Overview

In one aspect of the disclosure, when a switchover is initiated from one or more nodes of a first cluster of a peered cluster storage environment to a node of a second cluster of the environment, progress of the switchover is tracked using progress identifiers (e.g., a plurality of flags, for instance, binary flags) indicative of whether steps of a switchover sequence have completed. Further, a monotonically increasing generation number is maintained for each aggregate, and for each of the potential sources of non-volatile random access memory (NVRAM) replay. The sources of NVRAM replay may include a local portion of the node's NVRAM, a disaster recovery (DR) partner portion of the local node's NVRAM, and potentially previously-saved NVRAM data files. Should an interruption (e.g., error) occur during the switchover sequence, which prevents completion, and a switchover is subsequently retried or an early switchback performed, logged operations may be replayed from a selected one of the sources of NVRAM replay based on the progress identifiers (e.g., plurality of flags) and/or comparison of generation numbers. In this manner, the "correct" logged operations (e.g., data access requests) may be replayed to recover from the particular interruption (e.g., error) scenario and ensure data consistency.

Peered Cluster Storage Environment

Figure 1:
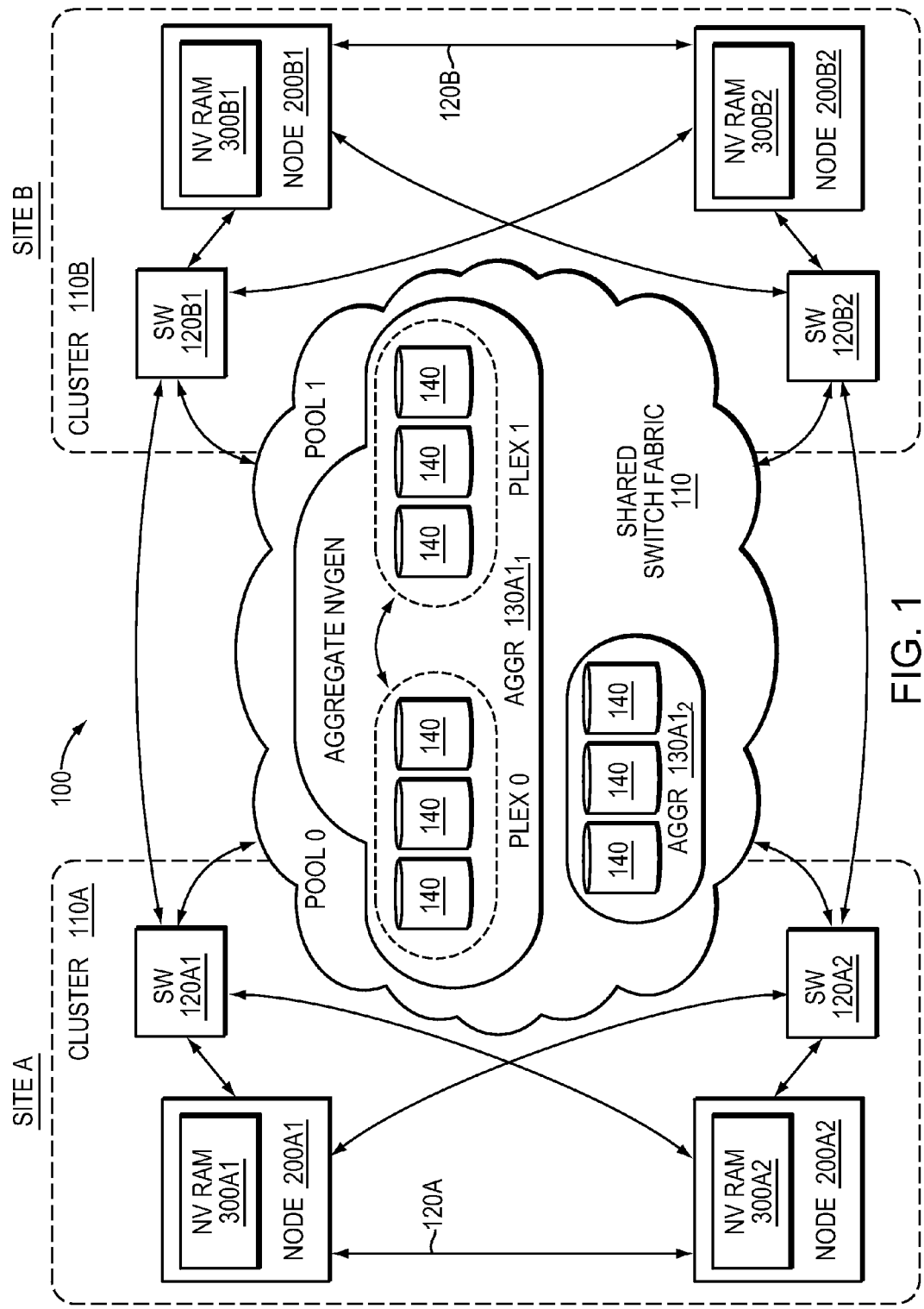
FIG. 1 is a block diagram of an example peered cluster storage environment, including nodes disposed at multiple sites, e.g., site A and site B.

FIG. 1 is a block diagram of an example peered cluster storage environment (e.g., a cluster disaster recovery (DR) group) 100, including nodes 200 (or more specifically 200A1, 200A2, 200B1, 200B2) disposed at multiple sites, e.g., site A and site B. The sites may be physically remote from one another. The nodes 200 at each site may be arranged in a cluster 110 composed of a high availability (HA) pair (e.g., a local node, and an HA partner node) interconnected by an HA interconnect 125 (or more specifically 125A, 125B). Such HA partner arrangement may provide redundancy within the cluster, such that, if one node should fail, the other node may assume its role by performing a takeover.

Similarly, a cluster and its constituent nodes may be paired with another cluster and its constituent nodes to create DR pairs (e.g., a local node, and DR partner node). The local node may be connected to its DR partner node via switches (e.g., Fibre Channel (FC) switches) 120 (or more specifically 120A1, 120A2, 120B1, 120B2) which may be arranged in a redundant relationship at each site. Such a DR partner arrangement may provide redundancy across sites, such that if the cluster at one site should fail, the cluster at the other site may assume its role by performing a switchover (i.e. a type of cross-cluster takeover).

Whether a node is a local node, an HA partner node, a DR partner node, or a DR auxiliary node (i.e., the HA partner node of a DR partner node) depends on the perspective from which one looks at the peered cluster storage environment. For example, from the perspective of node 200A1, node 200A1 is the local node, node 200A2 is the HA partner node, node 200B1 is the DR partner node, and node 200B2 is the DR auxiliary node. Likewise, from the perspective of node 200B1, node 200B1 is the local node, node 200B2 is the HA partner node, node 200A1 is the DR partner node, and node 200A2 is the DR auxiliary node. While much of the description below is from the perspective of node 200A1 (such that node 200A1 is referred to as the local node) or from the perspective of node 200B1 (such that node 200B1 is referred to as the local node), perspective from other nodes may be utilized to better illustrate specific concepts. It should be understood that the choice of perspective is simply for purposes of illustration, and that specific nodes are not limited to singular roles (e.g., local, HA partner, DR partner, and DR auxiliary), but instead simultaneously fulfill multiple roles.

Each node 200 is coupled to a shared storage fabric 110 via a switch (e.g., FC switch) 120. The shared storage fabric 110 includes a plurality of storage devices (e.g., disks) 140 upon which data may be stored. Clients (not shown) may access data stored in the shared storage fabric 110 by interacting with the nodes 200 in accordance with a client/server model of information delivery. In response to requests (e.g., data access requests) from the clients, the nodes 200 may perform operations (e.g., service data access requests) directed to storage devices 140 of the shared storage fabric 110.

The storage devices 140 within the shared storage fabric 110 may be physically divided into pools (e.g., Pool 0, Pool 1) which may be located at different sites (e.g., Site A, Site B). Storage devices of a pool may be arranged on one or more disk shelves (not shown). The storage device of each pool may be organized as Redundant Array of Independent (or Inexpensive) Disks (RAID) groups, implemented at a RAID level, such as RAID-4 or another type of RAID implementation, such as RAID double-parity (RAID-DP). It should be understood that a wide variety of other levels and types of RAID may alternatively be utilized.

One or more RAID groups may be organized into aggregates (AGGRs) 130 (or more specifically $130A1_1$, $130A1_2$) that represent collections of storage. The aggregates 130 may include a root aggregate that contains a root volume storing special directories and configuration files, as well as data aggregates that store user data. Each aggregate is generally "owned" by a single node 200 which is arranged to perform operations (e.g., service data access requests) directed to that aggregate. Further, in order to provide greater redundancy than already provided via RAID parity, certain aggregates 130 may be mirrored, such that the RAID groups in the aggregate are themselves mirrored between two groups of storage devices referred to as "plexes", that may be, for example, disposed in different pools (e.g., Pool 0, Pool 1). For example, an aggregate $130A1_1$ may include a Plex 0 that utilizes storage devices of Pool 0 and a Plex 1 that utilizes storage devices of Pool 1. The RAID groups in Plex 0 may have mirrored counterparts in Plex 1 according to RAID-level mirroring techniques.

To facilitate access to data stored in the shared storage fabric 110, the nodes 200 may further "virtualize" the storage space. For example, a file system, e.g. a Write Anywhere File Layout (WAFL®) file system, may logically organize stored data into a hierarchical structure of named storage containers, such as directories and files. Each file may be implemented as a set of disk blocks configured to store data, whereas a directory may be implemented as a specially formatted file in which names and links to other files and directories are stored. Further, information may be organized into a hierarchical structure of storage containers, such as blocks, that are exported as named logical unit numbers (luns). The nodes 200 may service data access requests based on file-based access protocols, such as the Common Internet File System (CIFS) protocol or Network File System (NFS) protocol, to permit access to certain storage containers, such as files and directories. Likewise, the nodes 200 may service data access requests based on block-based access protocols, such as the Small Computer Systems Interface (SCSI) protocol encapsulated over TCP (iSCSI) and SCSI encapsulated over Fibre Channel (FCP), to permit access to other types of storage containers, such as blocks or luns.

Each node 200 may log information, such as ongoing operations (e.g., data access requests) directed to the storage devices of the aggregates 130 owned by the node that have been acted upon (i.e., serviced) but not yet been committed (i.e., persistently stored) to the storage devices. The logged information may be maintained in a non-volatile random access memory (NVRAM) 300 of the node 200 that owns the aggregate 130. During normal operation information in the NVRAM of the node 200 may be mirrored to the NVRAM of its HA partner node, to provide redundancy. For example, considering node 200A1 as the local node, during normal operation data in the NVRAM (e.g., 300A1) of the local node (e.g., node 200A1) is mirrored to the NVRAM (e.g., 300A2) of the HA partner node (e.g., node 200A2), and maintained in the NVRAM of the HA partner node. As part of a takeover sequence performed by the HA partner node (e.g., 200A2) in response to a failure of the local node (e.g., node 200A1), the HA partner node may assume the identity of the failed node, access the storage devices utilized by the failed node, replay the mirrored information maintained in its NVRAM (e.g., 300A2), and otherwise take over for the failed node.

Similarly, during normal operation information in the NVRAM of a node 200 that owns an aggregate may be mirrored to the NVRAM of the DR partner node (e.g., node 200B1) and maintained in the NVRAM of the DR partner node to provide further redundancy. For example, considering node 200A1 as the local node, during normal operation, information in the NVRAM (e.g., 300A1) of the local node (e.g., node 200A1) is mirrored to the NVRAM (e.g., 300B1) of the DR partner node (e.g., node 200B1) and maintained in the NVRAM of the DR partner node. As part of a switchover sequence performed by the DR partner node (e.g., 200B1) in response to a failure of the cluster at the site of the local node (e.g., cluster 110A at Site A), the DR partner node may take over and replay the mirrored information maintained in its NVRAM (e.g., 300B1), and otherwise take over. For mirrored aggregates (e.g., aggregate $130A1_1$), if certain plexes (e.g., Plex 0) located at the failed site (e.g., Site A) are no longer operable, the switchover may utilize the plexes (e.g., Plex 1) at the other site (e.g., Site B).

Further, since the DR partner node (e.g., 200B1) itself has an HA partner node (e.g., auxiliary node 200B2), it should be understood that information in the NVRAM (e.g., 300A1) of a local node (e.g., node 200A1) mirrored to the DR partner node (e.g., 200A2) may further be mirrored to the auxiliary node (e.g., node 200B2). This may allow the auxiliary node (e.g., node 200B2) to take over for the local node (e.g., node 200A1) in case of multiple failures (e.g., a failure also to DR partner node 200B1).

Figure 2:
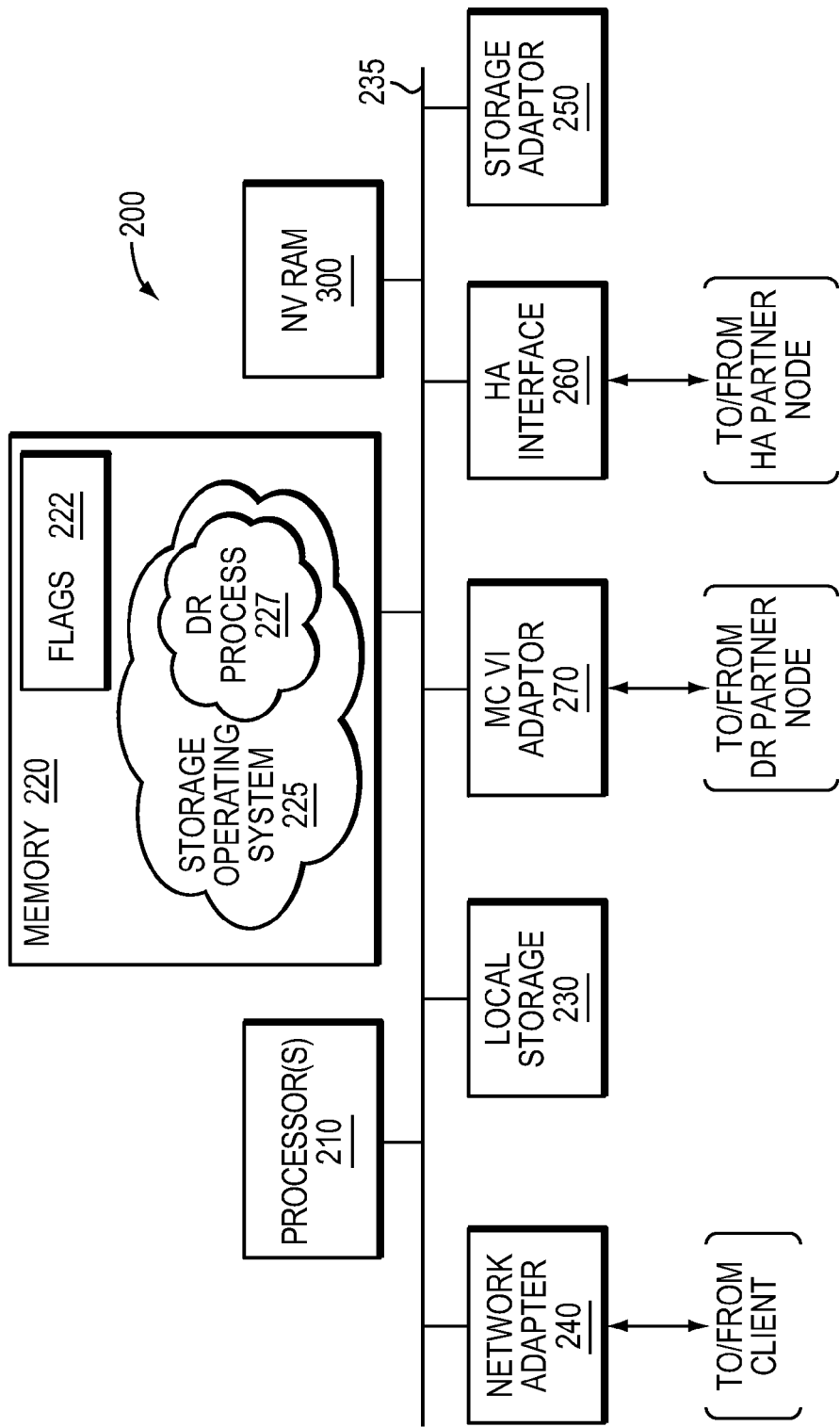
FIG. 2 is a block diagram of an example node that may be utilized in the peered cluster storage environment of FIG. 1.

FIG. 2 is a block diagram of an example node 200 that may be utilized in the peered cluster storage environment of FIG. 1. The node 200 may include one or more processors 210, a memory 220, local storage 230, a network adaptor 240, a metro cluster (MC) virtual interface (VI) adaptor 270, an HA interface 260, a storage adaptor 250, and an NVRAM 300 interconnected by a system interconnect 235, such as bus.

The processor(s) 210, and in some implementations, the adaptors/interfaces 240-270 may include processing elements and/or logic circuitry configured to execute software programs and manipulate the data structures. In some cases, the processing elements of the adaptors/interfaces 240-270 may be configured to offload some or all of the packet processing and storage access operations, respectively, from the processor(s) 210 to thereby increase the performance of the storage service provided by the node 200.

The memory 220 may include memory locations for storing at least some of the software programs and data structures. Among the software programs may be a storage operating system 225 that functionally organizes the node 200 by, among other things, invoking operations in support of the storage service implemented by the node 200. In one implementation, the storage operating system is the NetApp® Data ONTAP™ operating system available from NetApp Inc., Sunnyvale, Calif. that implements a WAFL® file system. However, a variety of other types of storage operating systems that implement other types of file systems may alternatively be utilized. The storage operation system 225 may include a large number of software processes, including a DR process 227 which may implement techniques described herein. Further, the data structures may include a large number of different data structures, including a flags data structure 222 that may store the state of ones of the flags described herein The local storage 230 may include one or more local storage devices, such as solid state drives illustratively embodied as flash storage devices, utilized by the node to persistently store configuration information provided by one or more processes that execute on the node 200. The network adaptor 240 may include one or more ports adapted to couple the node 200 to the clients over a network, which may, for example, take the form of an Ethernet network or an FC network. As such, the network adaptor 230 may include a network interface controller (NIC) that may include a TCP/IP offload engine (TOE) and/or an iSCSI host bus adaptor (HBA). Likewise, the storage adaptor 250 may include one or more ports adapted to couple the node 200, via a switch (e.g., FC switch) 120, to storage devices of the shared storage fabric 110, and cooperate with the storage operating system 225 executing on the node 200 to service operations (e.g., data access requests). In one implementation, the storage adaptor takes the form of an FC host bus adaptor (HBA).

As discussed above, the NVRAM 300 may log information, such as operations (e.g., data access requests) serviced by the node 200 that have not yet been committed (i.e., persistently stored) to the storage devices. Such information may be maintained in a local portion of the NVRAM 300. Further, to permit takeover and switchover operations, the NVRAM may also store mirrored copies of logged information of other nodes in the environment (e.g., the node's HA partner node, DR partner node, and DR auxiliary node). Such information may be maintained in respective other portions of the NVRAM 300, as explained in more detail below in reference to FIG. 3. In order to persistently store the logged information, the NVRAM 300 may include a back-up battery, or be designed to intrinsically have last-state retention capability (e.g., utilize non-volatile semiconductor memory) that allows the NVRAM to maintain information through system restarts, power failures, and the like.

An HA interface 260 may include port circuitry adapted to couple the node 200 to an HA partner node of a cluster 110 via an HA interconnect 125. The HA interface 260 may be utilized to mirror (copy) the certain logged information, such as operation (e.g., data access requests), maintained in the NVRAM of the node 200 to the NVRAM of its HA partner node, for example, utilizing a remote direct memory access (RDMA) protocol.

Further, the MC VI adaptor 270 may include port circuitry adapted to couple the node 200 to its DR partner node, for example via switches (e.g., FC switches) 120 or another mechanism. In one implementation, the MC VI adaptor 270 may be an FC VI adaptor. Similar to the HA interface, the MC VI adaptor may be utilized to mirror (copy) certain logged information, such as operations (e.g. data access requests), maintained in the NVRAM of the node 200 to the NVRAM of its DR partner.

Figure 3:
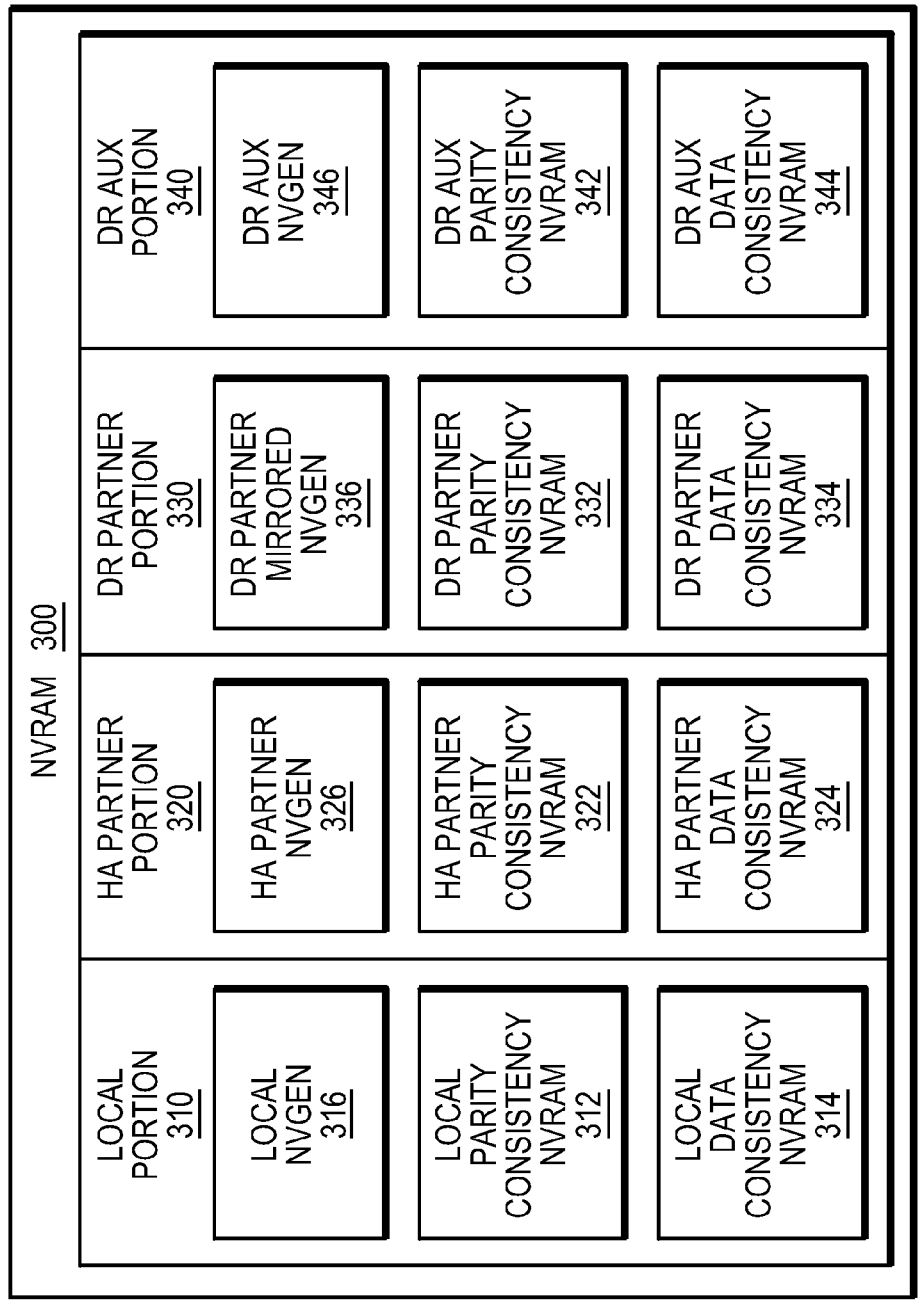
FIG. 3 is a diagram of an example organization of an NVRAM of a node.

FIG. 3 is a diagram of an example organization of an NVRAM 300 of a node 200. A local portion 310 of the NVRAM may store information about the local node, including logging operations (e.g. data access requests) serviced by the local node (node 200B1) but not yet committed. Portions of the logged information relating to parity may be stored in a local parity consistency NVRAM part 312, while logged information relating to data may be stored in a local data consistency NVRAM part 314. The information in the local portion 310B1 may be associated with a local NVRAM generation number (NVGEN), which is a monotonically increasing number representing a point in time at which the information was logged. Details regarding the use of such NVGEN may be found further below.

An HA partner portion 320 of the NVRAM 300 may store information mirrored from the node's HA partner node. Portions of the mirrored information relating to parity may be stored in an HA partner parity consistency NVRAM part 322, while mirrored information relating to data may be stored in an HA partner data consistency NVRAM part 324. Likewise a DR partner portion 330 of the NVRAM 300 may store information mirrored from the node's DR partner node. Portions of the mirrored information relating to parity may be stored in a DR partner parity consistency NVRAM part 332, while mirrored information relating to data may be stored in a DR partner data consistency NVRAM part 334. The NVGEN from the DR partner node (i.e. a DR partner mirrored NVGEN) 336 may be maintained in association with this information. Further, a DR auxiliary portion 340 of the NVRAM 300 may store information from the node's HA partner node's DR partner, mirrored through successive mirroring operations. Portions of the information relating to parity may be stored in a DR auxiliary parity consistency NVRAM part 342, while information relating to data may be stored in a DR auxiliary data consistency NVRAM part 344.

Switchover

Figure 4:
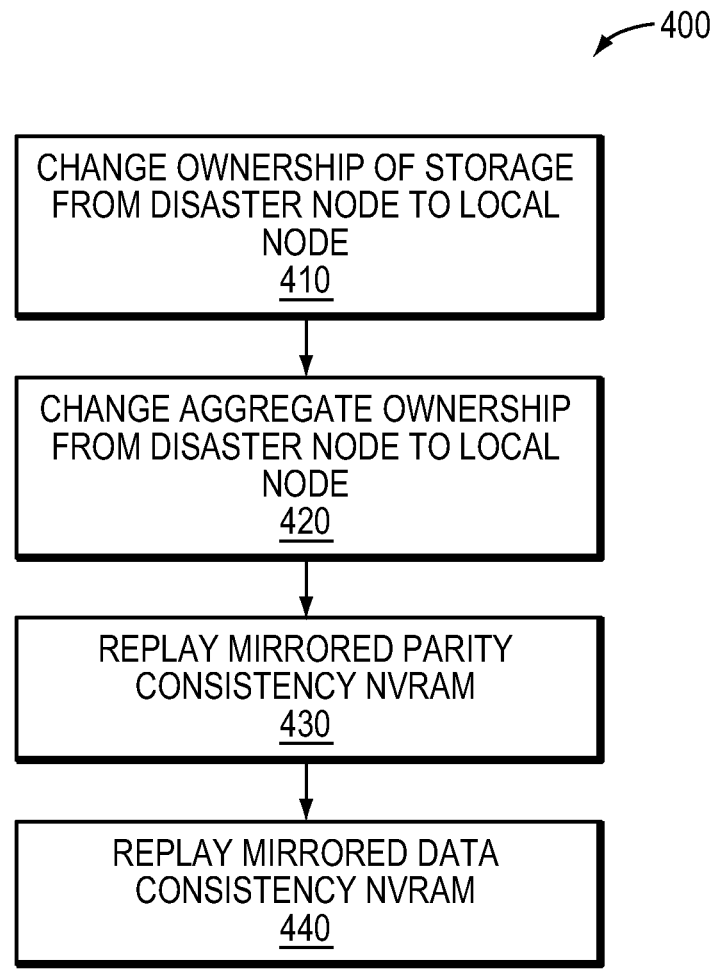
FIG. 4 is a flow diagram of a successful (e.g., uninterrupted) switchover sequence.

FIG. 4 is a flow diagram of a successful (e.g., uninterrupted) switchover sequence 400 performed by a DR process of a node (e.g., 200B1) in response to a failure of a cluster (e.g., cluster 110A) at a site (e.g., Site A). For purposes of illustration, the steps are described from the perspective of node 200B1, such that node 200B1 is the local node and its DR partner node 200A1 is a failed node (referred to sometimes below as the "disaster node"). While switchover from a single disaster node (200A1) is discussed in this example, it should be understood that switchover may involve multiple disaster nodes being switched over to the same local node. At step 410, ownership of storage devices (e.g., mirrored storage devices of Plex 1, assuming Plex 0 has failed along with Site A) is changed from the disaster node (e.g., node 200A1) to the local node (e.g., node 200B1). At step 420, ownership of aggregates (e.g., aggregate $130A1_1$) previously-owned by the disaster node (e.g., node 200A1) is changed to the local node (e.g., node 200B1) on a per-aggregate basis (i.e., the aggregates are localized). At step 430, mirrored information in the DR partner parity consistency NVRAM part in the local node's NVRAM is replayed, or re-parity occurs, to restore the parity consistency to the storage devices of the newly owned aggregates. At step 440, mirrored information in the DR partner data consistency NVRAM part in the local node's NVRAM is replayed to persistently store the data to the storage devices of the newly owned aggregates. Thereafter, the sequence completes with the local node (e.g., node 200B1) now servicing operations (e.g., data access requests) of clients. As such, information, including operations (e.g., data access requests), associated with the aggregates is now logged to the local portion of the local node's NVRAM.

However, sometimes a switchover sequence such as the one shown in FIG. 4 may be interrupted, for example, due to a reboot or panic of the local node (e.g., node 200B1) during the switchover sequence, before it may reach completion. Upon resumption of normal operation (e.g., on reboot or clearing of the panic), the node may desire to complete the switchover sequence, yet may have difficulty determining how far the prior switchover progressed, and from which NVRAM source (e.g., the DR partner portion of the node's NVRAM, a local portion of the node's NVRAM, or another source as discussed below) to replay logged information, such as operations (e.g., data access requests). This issue may be exacerbated by the potential for storage devices to temporarily become inaccessible during a switchover, or in the interim between an interrupted switchover and a retried switchover or early switchback.

Among other issues, storage devices of aggregates may become inaccessible (e.g., due to failure of a shelf in which they are installed, being powered off, etc.), only later to "reappear" (e.g., when the shelf is repaired, the storage devices are powered on, etc.). Should storage devices of an aggregate become inaccessible and later reappear (causing what may be termed a "late arriving aggregate"), a node may save the DR partner portion of its NVRAM related to the inaccessible aggregate to a saved NVRAM data file (e.g., saved on the root aggregate), so that the information is available should the aggregate again become accessible. Yet the potential presence of saved NVRAM data files adds another possible source from which to replay logged information. The "correct" information to recover may be in the DR partner portion of the local node's NVRAM, the local portion of the local node's NVRAM, or potentially in previously-saved NVRAM data files. Yet with existing techniques, a node may have little ability to determine which NVRAM source to utilize in response to a particular interruption scenario (e.g., error scenario).

In aspect of the disclosure, when a switchover sequence is initiated between one or more disaster nodes of a first cluster of a peered cluster storage environment to a local node of a second cluster of the environment, progress of the switchover is tracked using progress identifiers (e.g., a plurality of flags, for instance, binary flags) indicative of whether steps of the switchover sequence have completed. Further, a monotonically increasing generation number (e.g., NVGEN) is maintained for each aggregate (e.g., an aggregate NVGEN), and for each of the potential sources of NVRAM replay. For example, referring back to FIG. 3, a local NVGEN 316 may be maintained for the local portion of the local node's NVRAM, a DR partner mirrored NVGEN 336 may be maintained for the DR partner portion of the local node's NVRAM, an HA partner NVGEN 326 may be maintained for the HA partner portion of the local node's NVRAM, a DR Auxiliary NVGEN 346 may be maintained for the DR auxiliary portion of the local node's NVRAM, and potentially additional NVGEN values may be maintained for previously-saved NVRAM data files. Should an interruption (e.g., error) occur during a switchover sequence which prevents completion of the switchover, and switchover is subsequently retried or early switchback performed, information may be replayed from one of the DR partner portions of the local node's NVRAM, the local portion of the local node's NVRAM, or previously-saved NVRAM data files, based on the progress identifiers (e.g., plurality of flags) and/or comparison of NVGENs. In this manner, the "correct" information, such as operations (e.g., data access requests), may be replayed to recover from the particular interruption scenario (e.g. error scenario).

Figure 5:
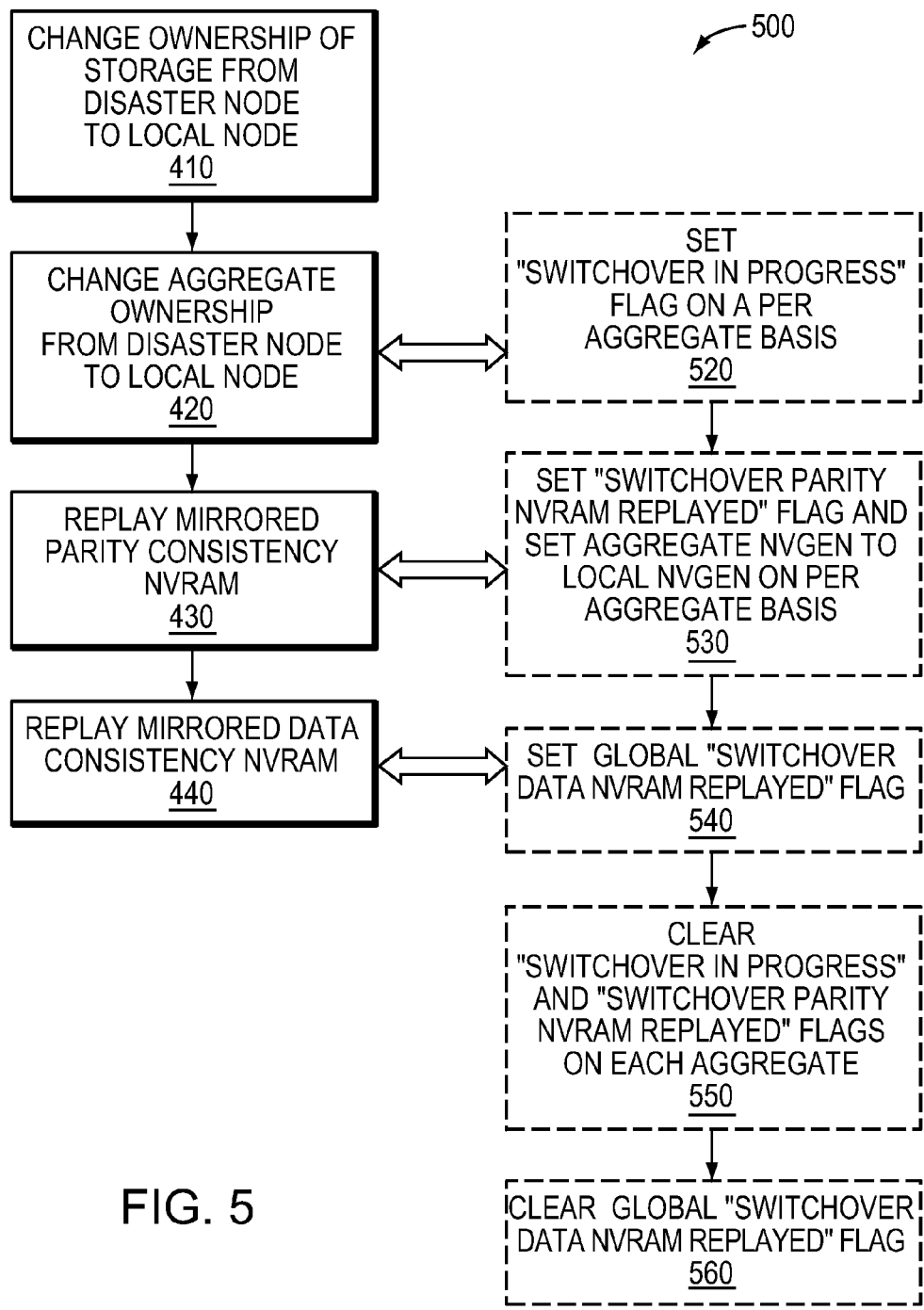
FIG. 5 is a flow diagram indicating example tracking steps performed responsive to (e.g., upon completion of) corresponding switchover steps of FIG. 4.

FIG. 5 is a flow diagram 500 indicating example tracking steps 520-560 performed by a DR process of a node responsive to (e.g., upon completion of) corresponding switchover steps 410-440 from FIG. 4. Again, for purposes of illustration, the steps are described from the perspective of node 200B1, such that node 200B1 is the local node. Further, assume that the local NVGEN on the local node (e.g., node 200B1) is 444 and that the DR partner mirrored NVGEN (e.g., for node 200A1) is 555. Absent an interruption, the aggregate NVGEN for an aggregate (e.g., aggregate 130A1₁) previously-owned by the disaster node (e.g., node 200A1) would also be 555. As in FIG. 4, at step 410, ownership, of storage devices is changed from the disaster node (e.g., node 200A1) to the local node (e.g., node 200B1). Similarly, at step 420, ownership of aggregates (e.g., aggregate 130A1₁) is changed from the disaster node (e.g., node 200A1) to the local node (e.g., node 200B1), on a per-aggregate basis. In responsive step 520, completion of this task is tracked by setting a "Switchover in Progress" flag, on a per aggregate basis. At step 430, mirrored information in the DR partner parity consistency NVRAM part in the local node's NVRAM is replayed, or re-parity occurs, for each aggregate. In responsive step 530, completion of this task is tracked by setting a "Switchover Parity NVRAM Replayed" flag, on a per aggregate basis. Further, for each aggregate involved in the switchover, its aggregate NVGEN (e.g., initially 555 for aggregate 130A1₁) is set to the local NVGEN (e.g., 444) of the local node (e.g., 200B1). At step 440, mirrored information in the DR partner data consistency NVRAM part in the local node's NVRAM is replayed for each aggregate. In responsive step 540, completion of this task is tracked by setting a global "Switchover Data NVRAM Replayed" flag. After completion of step 440 and the conclusion of the sequence 410-440, at responsive step 550, the "Switchover in Progress" and "Switchover Parity NVRAM Replayed" flags are cleared for each aggregate. Further, after this, at responsive step 560, the global "Switchover data NVRAM Replay Flag" is cleared, indicating successful completion of the switchover sequence.

Retried Switchover or Early Switchback after Error

Figure 6:
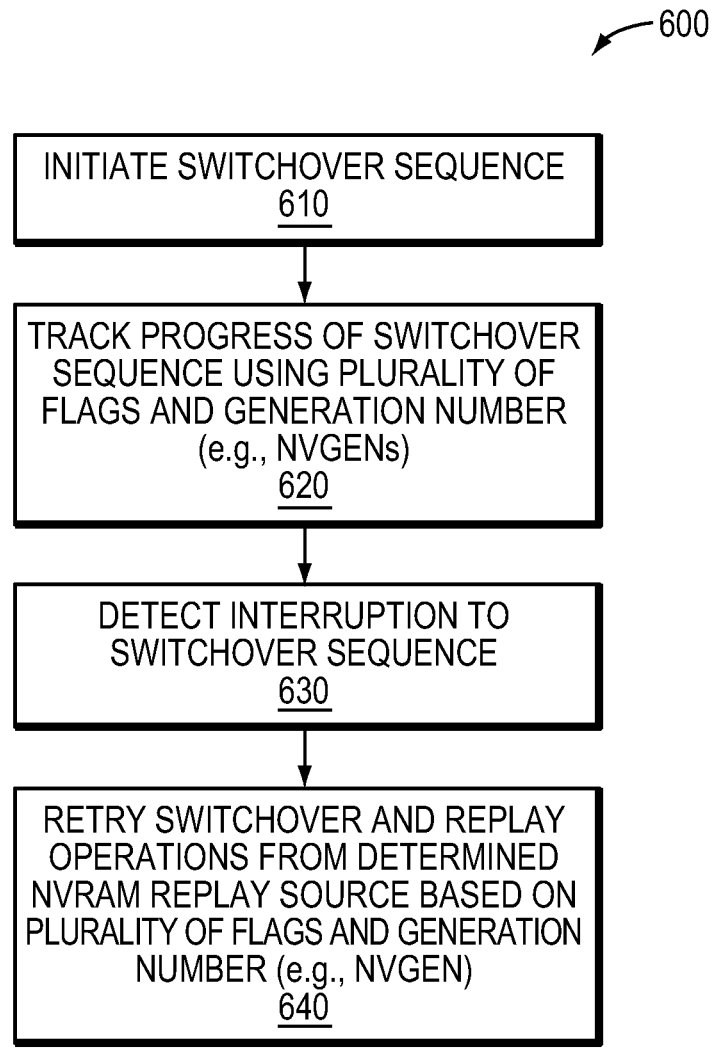
FIG. 6 is a flow diagram of an example generalized series of steps for recovery from an interruption (e.g., error) that prevents completion of a switchover sequence.

FIG. 6 is a flow diagram of an example generalized series of steps 600 for recovery from an interruption (e.g., error) that prevents completion of a switchover sequence. Again, for purposes of illustration, the steps are described from the perspective of node 200B1. At step 610, a switchover sequence is initiated by the DR process of the local node (e.g., 200B1) in response to a failure of a cluster (e.g., cluster 110A) at a site (e.g., Site A) including a DR partner node (e.g., 200A1). At step 620, the DR process tracks progress of the switchover sequence using progress identifiers (e.g., a plurality of flags, for instance, binary flags) indicative of whether steps of the switchover sequence have completed, and generation numbers (e.g., NVGENs) maintained for each aggregate. At step 630, an interruption is detected during the switchover sequence (e.g., a reboot or panic of node 200B1)

that prevents completion of the switchover sequence. At subsequent step 640, upon resumption of normal operation (e.g., on reboot or clearing of the panic) the DR process of the local node (e.g., 200B1) either retries switchover or performs an early switchback. The retried switchover or early switchback decides whether to replay information and if so, determines NVRAM replay source (e.g., the DR partner portion of the local node's NVRAM, the local portion of the local node's NVRAM, or a previously-saved NVRAM data file) to replay information from, based on the progress identifiers (e.g., plurality of flags) and/or comparison of NVGENs.

Figure 7:
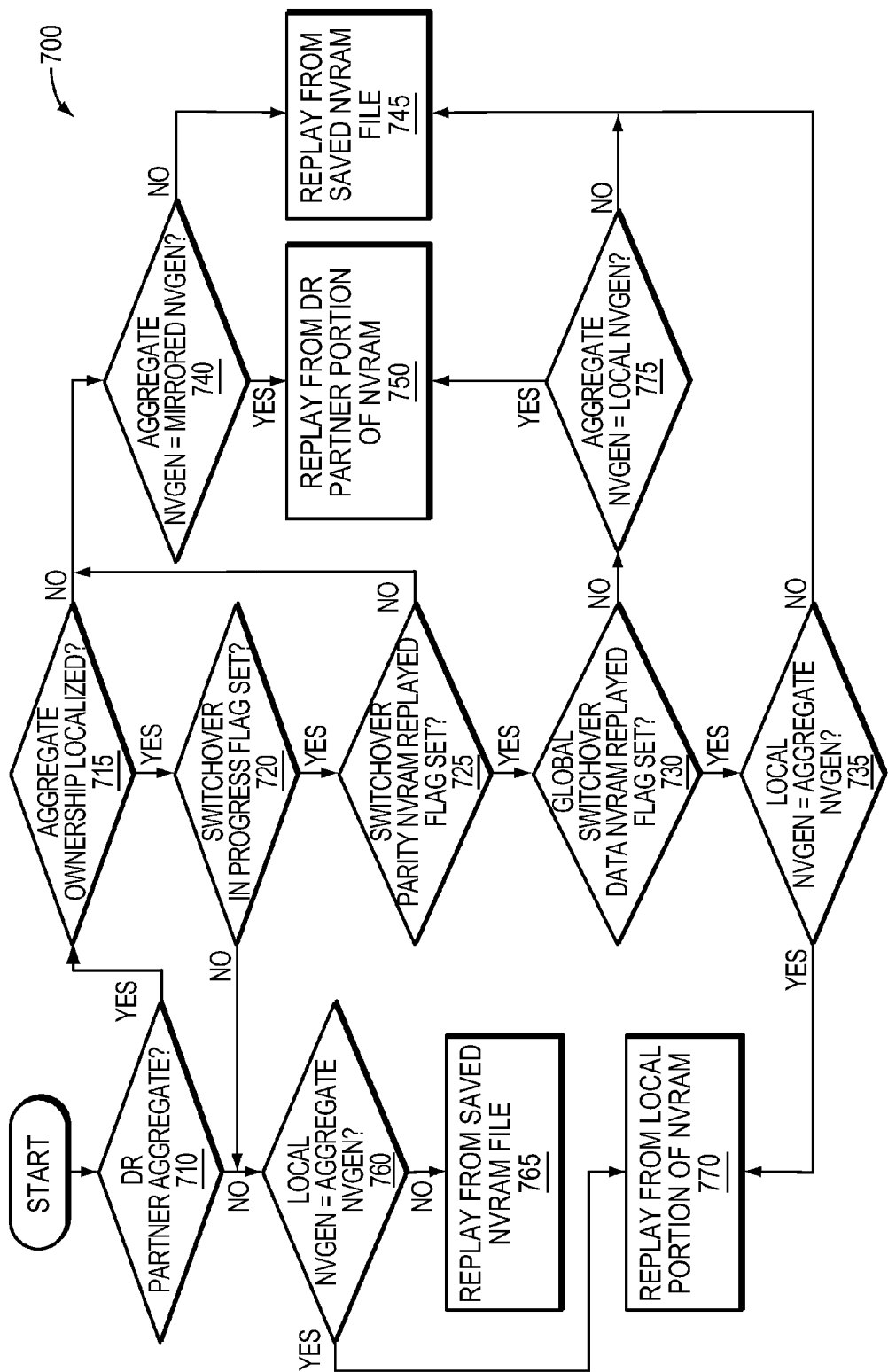
FIG. 7 is a flow diagram of an example series of steps performed by a disaster recovery (DR) process of a node to determine a "correct" NVRAM replay source for several illustrative interruption (e.g., error) scenarios.

FIG. 7 is a flow diagram of an example series of steps 700 performed by a DR process of a node to determine a "correct" NVRAM replay source for several illustrative interruption (e.g., error) scenarios. It should be understood there may be a vast number of possible types of interruption scenarios with various sequences of successive errors and/or late arriving aggregates, and that different combinations of progress identifiers (e.g., plurality of flags) and/or comparisons of NVGENs may be utilized to determine a "correct" NVRAM replay source in each of these unique cases. FIG. 7 is intended simply to illustrate operations in a few illustrative interruption (e.g., error) scenarios, thereby demonstrating general principles that may be extended to the wide variety of other specific scenarios that may be encountered. Again, for purposes of illustration, the steps 700 are described from the perspective of node 200B1.

At step 710, the DR process of the local node (e.g., node 200B1) determines where an aggregate is from a DR Partner. If the aggregate is from a DR partner, execution proceeds to step 715, where it is determined whether the aggregate has been localized. Otherwise, execution proceeds to step 760. If step 715 determines that the aggregate has been localized, execution proceeds to step 720, where it is determined whether the "Switchover Progress Flag" is set for that aggregate. Otherwise, execution proceeds to step 740. If at step 720, it is determined that the "Switchover in Progress Flag" is set, execution proceeds to step 725, where it is determined whether the "Switchover Parity NVRAM Replayed" flag is set. Otherwise, execution proceeds to step 760. If at step 725 it is determined that the "Switchover Parity NVRAM Replayed" flag is set, execution proceeds to step 730, where it is determined whether the global "Switchover Parity NVRAM Replayed" flag is set. Otherwise, execution proceeds to step 740. If at step 730 it is determined that the global "Switchover Data NVRAM Replayed" flag is set, execution proceeds to step 735, where it is determined whether the local NVGEN equals the aggregate (e.g. aggr130A1)) NVGEN. Otherwise, execution proceeds to step 775. If at step 735 it is determined that the local NVGEN equals the aggregate (e.g. aggr130A1) NVGEN, execution proceeds to step 770, where the local portion of the local node's NVRAM is used as the NVRAM replay source. Otherwise, execution proceeds to step 745, where a saved NVRAM data file is selected as the NVRAM replay source.

If execution had proceed to step 760, the local NVGEN is compared to the aggregate NVGEN. If the local NVGEN is equal to the aggregate NVGEN, the local portion of the local node's NVRAM is used as the NVRAM replay source at step 770. Otherwise, execution proceeds to step 765, where a saved NVRAM data file is selected as the NVRAM replay source.

If execution had proceed to step 740, the aggregate NVGEN is compared to the DR partner mirrored NVGEN. If the aggregate NVGEN is equal to the DR partner mirrored NVGEN, the DR partner portion of the local node's NVRAM is used as the NVRAM replay source at step 750. Otherwise, execution proceeds to step 745, where a saved NVRAM data file is selected as the NVRAM replay source.

If execution had proceed to step 775, the aggregate NVGEN is compared to the local NVGEN. If the aggregate NVGEN is equal to the local NVGEN, the DR partner portion of the local node's NVRAM is used as the NVRAM replay source at step 750. Otherwise, execution proceeds to step 745, where a saved NVRAM data file is selected as the NVRAM replay source.

These example techniques may be further understood by reference to various example interruption (e.g., error) scenarios. Each of these scenarios is described from the perspective of node 200B1.

Example Scenario #1

Figure 8:
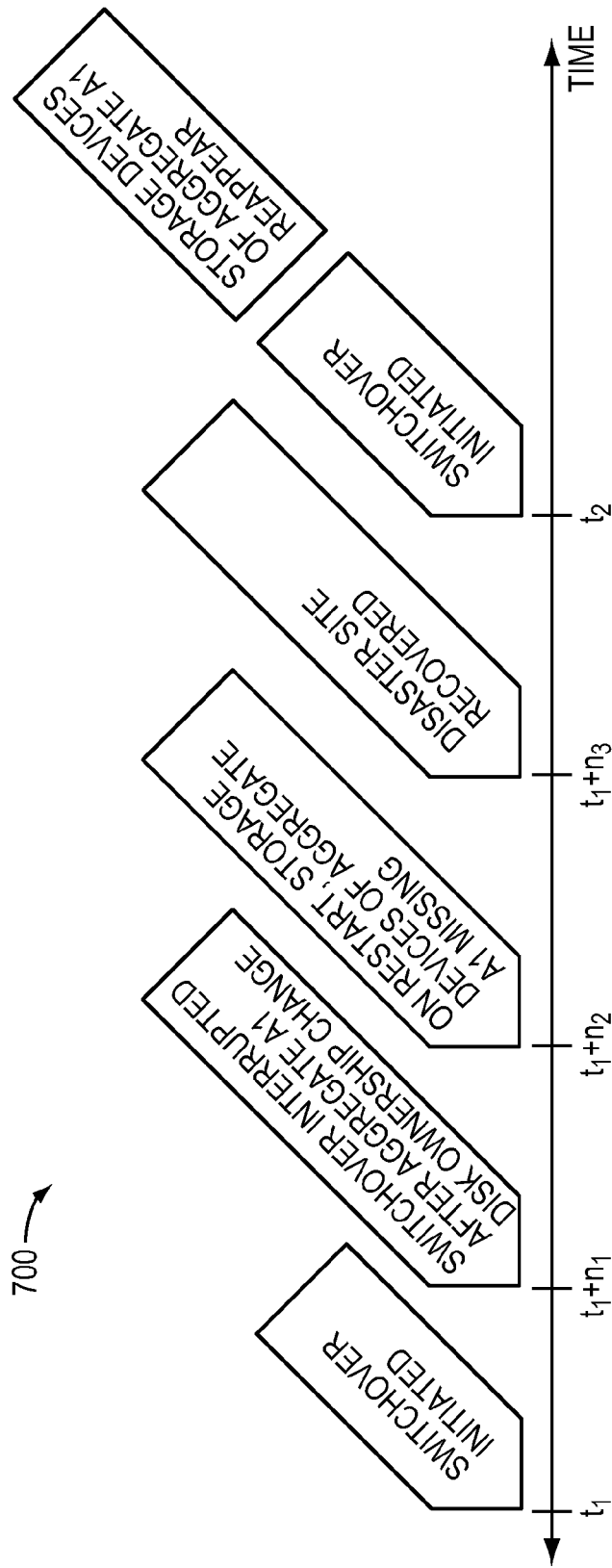
FIG. 8 is a diagram illustrating a first example scenario.

FIG. 8 is a diagram 800 illustrating a first example scenario. Assume at time $t_1$ a switchover is initiated by a DR process of a local node (e.g., 200B1) in response to a failure of a cluster (e.g., cluster 110A) at a site (e.g., Site A) including a disaster node (e.g., node 200A1). An aggregate A1 (e.g., 130A1$_1$, 130A1$_2$) having an NVGEN of 554 may begin to be switched over. However, at time $t_1+n_1$ the switchover sequence is interrupted after ownership of the storage devices of the disaster node is changed from the disaster node to the local node (e.g., node 200B1), i.e. according to step 410 of FIG. 5. The interruption leads to a system restart, and on restart at time $t_1+n_2$, the storage devices of aggregate A1 (e.g., aggregate 130A1$_1$) disappear (e.g., due to failure of a shelf in which they are installed, being powered off, etc.). Switchover may complete without these storage devices. To preserve the information in the DR partner portion of the local node's NVRAM, the information is saved to one or more NVRAM data files, which include NVGEN 554. Later, at time $t_1+n_3$, the cluster (e.g., cluster 110A) at the disaster site (e.g., Site A) is recovered. However, aggregate A1 storage devices, and therefore aggregate A1 (e.g., aggregate 130A1$_1$) may still not be visible (e.g., invisible with the storage devices having ownership set to a node of the cluster 110B at Site B).

At a subsequent time $t_2$, another switchover may be initiated by the DR process of the local node (e.g., 200B1) in response to another failure of the cluster (e.g., cluster 110A). An aggregate A2 (e.g., aggregate 130A1$_2$) having an NVGEN of 555 may begin to be switched over. However, at the same time, aggregate A1 (e.g., aggregate 130A1$_1$) may reappear (e.g., when the shelf is repaired, the storage devices are powered on, etc.). So two aggregates are now present that need to have logged information replayed from the "correct" NVRAM sources. To determine the correct NVRAM sources, using the example steps 700 of FIG. 7 which cover this type of example scenario, the DR process of the local node (e.g., 200B1) determines that neither aggregate has been localized since they do not have a "Switchover in Progress" flag set. So the DR process concludes that neither aggregate should use the local portion of the local node's NVRAM as the NVRAM replay source. Further, the DR process determines that for Aggregate A1 (e.g., aggregate 130A1$_1$) the aggregate NVGEN (554) does not match a DR partner mirrored NVGEN (555), so the DR portion of the local node's NVRAM should not be used as the NVRAM replay source. Accordingly, the saved NVRAM data file is used as the NVRAM replay source for Aggregate A1 (e.g., aggregate 130A1$_1$) Likewise, the DR process determines that for Aggregate A2 (e.g., aggregate 130A1$_2$) that the aggregate NVGEN (555) matches the DR partner mirrored NVGEN (555).

Accordingly, for Aggregate A2 (e.g., aggregate $130A1_2$), the DR portion of the local node's NVRAM is used as the NVRAM replay source.

Example Scenario #2

Figure 9:
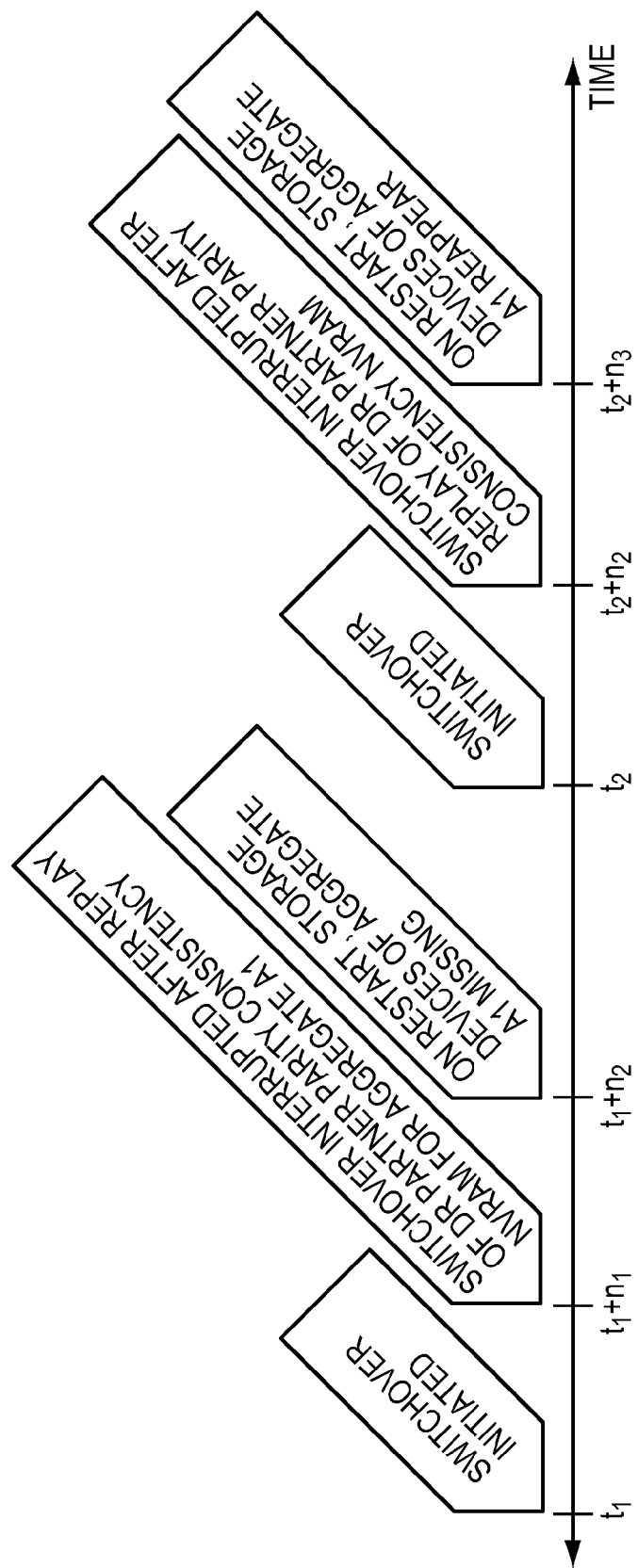
FIG. 9 is a diagram illustrating a second example scenario.

FIG. 9 is a diagram 900 illustrating a second example scenario. Assume at time $t_1$ a switchover is initiated by a DR process of a local node (e.g., 200B1) in response to a failure of a cluster (e.g., cluster 110A) at a site (e.g., Site A) including a disaster node (e.g., node 200A1). An aggregate A1 (e.g., aggregate $130A1_1$) having an NVGEN of 554 may begin to be switched over. However, at time $t_1+n_1$, the switchover sequence is interrupted after the mirrored parity consistency NVRAM part is replayed from the DR portion of the local node's NVRAM, or re-parity occurs, i.e. according to step 430 of FIG. 5. At this time, the local NVGEN of 442 at the local node (e.g., node 200A1) is associated with aggregate A1 (e.g., aggregate $130A1_1$). The interruption leads to a system restart, and on restart, at time $t_1+n_2$, the storage devices of aggregate A1 (e.g., aggregate $130A1_1$) disappear (e.g., due to failure of a shelf in which they are installed, being powered off, etc.). To preserve the information in the data consistency part of the NVRAM part DR partner portion of the local node's NVRAM, the information is saved to one or more NVRAM data files, being associated with NVGEN 554. Later, at time $t_1+n_3$, the cluster (e.g., cluster 110A) at the disaster site (e.g., Site A) is recovered. However, aggregate A1 storage devices, and therefore aggregate A1 (e.g., aggregate $130A1_1$) may still not be visible (e.g., invisible with the storage devices having ownership set to a node of Site B).

At subsequent time $t_2$, another switchover may be initiated by the DR process of the local node (e.g., 200B1) in response to another failure of the cluster (e.g., cluster 110A). An aggregate A2 (e.g., aggregate $130A1_2$) having an NVGEN of 555 may begin to be switched over. However, at time $t_2+n_2$ the switchover sequence is interrupted after the mirrored data consistency NVRAM part is replayed from the DR portion of the local node's NVRAM, i.e. according to step 440 of FIG. 5. On restart, aggregate A1 (e.g., aggregate $130A1_1$) may reappear (e.g., when the shelf is repaired, the storage devices are powered on, etc.) along with aggregate A2 (e.g., aggregate $130A1_2$). So, again, two aggregates are present that need to have logged information replayed from the "correct" NVRAM sources. To determine the correct NVRAM sources, using the steps 700 of FIG. 7 which cover this type of example scenario, the DR process of the local node (e.g., 200B1) determines that Aggregate A1 (e.g., aggregate $130A1_1$) has been localized since its "Switchover in Progress" flag is set. Further, the DR process determines that the parity consistency portion of the DR NVRAM was replayed, or re-parity started, as the "Switchover Parity NVRAM Replayed" flag is set. Since the "Global Switchover Data NVRAM Replayed" flag is also set, the DR process determines that for Aggregate A1 (e.g., aggregate $130A1_1$) the aggregate NVGEN (442) does not match a local NVGEN (444). Since it does not match, the saved NVRAM data file is used as the NVRAM replay source. Further, the DR process determines that for Aggregate A2 (e.g., aggregate $130A1_2$) the aggregate NVGEN (444) matches the local NVGEN (444). So the DR process concludes that either the local portion or the DR portion of the local node's NVRAM should be used as the NVRAM replay source. By looking to the "Switchover Data NVRAM Replayed" flag, and determining it is set, the DR process further concludes that the DR portion had previously been replayed and that aggregate A2 was serving data as a localized aggregate, so the local portion of the local node's NVRAM is used as the NVRAM replay source.

In summary, various aspects are discussed above for deciding whether to replay information and if so, determining a "correct" NVRAM replay source to use, during a retried switchover or early switchback between a node of a failed cluster and a node of another cluster of a peered cluster storage environment. It is to be understood that various other adaptations and modifications may be made within the spirit and scope of the disclosure. For example, reference is sometimes made to using a progress identifiers (e.g., plurality of flags) indicative of whether steps of the switchover sequence have completed together with generation numbers (NV-GENs). However it should be understood that, in other implementations, progress identifiers or generation numbers may be employed individually to track progress in various manners. Further, while a plurality of flags (e.g., binary flags) is discussed above as an example of progress identifiers, it should be understood that other types of identifiers, for example, enumerated (enum) types, may also be employed. Also, while the techniques above are discussed in relation to switchover, it should be understood that at least some of the techniques may also be utilized in a takeover sequence.

Further, it should be understood that the various components and/or elements described above may be implemented as software encoded on a non-transitory machine readable medium (e.g., a disk, CD, etc.) having executable instructions stored thereon for execution on one or more processors of a machine (e.g., a computer system), or may be implemented as hardware, firmware, or a combination of any of these. In general, the description is to be taken only by way of example. It is the object of the appended claims to cover all such variations and modifications as may come within the true spirit and scope of the disclosure.

What is claimed is:

1. A method comprising:
    initiating a switchover sequence between one or more nodes of a first cluster and a node of a second cluster of a peer-clustered storage environment, each cluster including one or more nodes coupled to a shared storage fabric that includes an aggregate of storage devices, the switchover sequence initiated in response to a failure of the first cluster, the switchover sequence including a replay of logged information to storage devices of the aggregate to ensure data consistency of the aggregate;
    tracking progress of the switchover sequence;
    detecting an interruption during the switchover sequence that prevents completion of the switchover sequence; and
    subsequent to the interruption, retrying switchover, wherein the retried switchover decides whether to replay logged information and, if so, determines a non-volatile random access memory (NVRAM) replay source to replay logged information based on the tracked progress.

2. The method of claim 1, wherein the tracking progress is performed using generation numbers, and wherein the determining the NVRAM replay source to replay logged information from is performed based on a comparison of the generation numbers.

3. The method of claim 1, wherein the switchover sequence comprises:
    changing ownership of the storage devices of the aggregate from the one or more nodes of the first cluster to the node of the second cluster;
    changing ownership of the aggregate from the one or more nodes of the first cluster to the node of the second cluster;

replaying logged information from a disaster recovery (DR) partner parity consistency NVRAM part in an NVRAM of the node of the second cluster; and replaying logged information from a DR partner data consistency NVRAM part in the NVRAM of the node of the second cluster.

4. The method of claim 3, further comprising:

in response to the changing ownership of the aggregate, setting a switchover in progress flag, on a per aggregate basis.

5. The method of claim 4, further comprising:

in response to replaying logged information from the DR partner parity consistency NVRAM part, setting a switchover parity NVRAM replayed flag, on a per aggregate basis.

6. The method of claim 5, further comprising:

subsequent to completing the switchover sequence, clearing the switchover in progress flag and the switchover parity NVRAM replayed flag, on a per aggregate basis.

7. The method of claim 3, further comprising:

in response to the replaying logged information from the DR partner parity consistency NVRAM part, setting an aggregate generation number to a local generation number of the node of the second cluster.

8. The method of claim 3, further comprising:

in response to replaying logged information from a DR partner data consistency NVRAM part, setting a global switchover data NVRAM replayed flag.

9. The method of claim 8, further comprising:

subsequent to completing the switchover sequence, clearing the global switchover data NVRAM replay flag.

10. The method of claim 2, wherein the comparison of the generation numbers comprises:

comparing an aggregate NVRAM generation number (NVGEN) to a disaster recovery (DR) partner mirrored NVGEN.

11. The method of claim 1, wherein the tracking progress is performed using progress identifiers, and wherein the determining the NVWAM replay source to replay logged information from is performed based on states of the progress identifiers.

12. An apparatus comprising:

a storage adaptor configured to couple the apparatus to a shared storage fabric that includes an aggregate of storage devices of a peer-clustered storage environment;

a metro cluster (MC) virtual interface (VI) adaptor configured to couple the apparatus to one or more nodes of a first cluster of the peer-clustered storage environment;

a non-volatile random access memory (NVRAM) having at least a local portion that stores logged information for the apparatus and a disaster recover (DR) partner portion that stores logged information mirrored from the one or more nodes of the first cluster;

a processor coupled to the storage adaptor, MC VI adaptor and NVRAM; and a memory coupled to the processor and configured to store processes, including a (DR process, executable on the processor, a replay process when executed operable to initiate a switchover sequence in response to a failure of the first cluster, the switchover sequence including a replay of logged information to storage devices of the aggregate to ensure data consistency of the aggregate, to track progress of the switchover sequence, to detect an interruption during the switchover sequence that prevents completion of the switchover sequence, and to retry switchover, wherein the retried switchover decides whether to replay logged information and, if so, determines whether to replay the logged information from a source based on the tracked progress.

13. The apparatus of claim 12, wherein the switchover sequence changes ownership of the storage devices of the aggregate from the one or more nodes of the first cluster to the apparatus, changes ownership of the aggregate from the one or more nodes of the first cluster to the apparatus, replays logged information from a (DR partner parity consistency NVRAM part in the DR partner portion of the NVRAM, and replays logged information from a DR partner data consistency NVRAM part in the DR partner portion of the NVRAM.

14. The apparatus of claim 12, wherein the DR process when executed is further operable to, in response to a change in ownership of the aggregate, set a switchover in progress flag, on a per aggregate basis.

15. The apparatus of claim 13, wherein the DR process when executed is further operable to, in response to replay of the logged information from the DR partner parity consistency NVRAM part, set a switchover parity NVRAM replayed flag, on a per aggregate basis.

16. The apparatus of claim 13, wherein the DR process when executed is further operable to, in response to replay of logged information from the DR partner parity consistency NVRAM part, set an aggregate generation number to a local generation number.

17. The apparatus of claim 13, wherein the DR process when executed is further operable to, in response to replay of logged information from the DR partner data consistency NVRAM part, set a global switchover data NVRAM replayed flag.

18. A non-transitory machine readable medium having executable instructions stored thereon, the executable instructions when executed on one or more processors operable to:

initiate a switchover sequence between one or more nodes to one or more other nodes, wherein each node is coupled to a shared storage fabric that includes an aggregate of storage devices, the switchover sequence initiated in response to a failure, the switchover sequence including a replay of logged information to storage devices of the aggregate to ensure data consistency of the aggregate;

track progress of the switchover sequence;

detect an interruption during the switchover sequence that prevents completion of the switchover sequence; and retry switchover or, the retried switchover or to decide whether to replay logged information, and if so, replay logged information from a non-volatile random access memory (NVRAM) replay source selected based on the tracked progress.

19. The non-transitory machine readable medium of claim 18, wherein the progress of the switchover sequence is tracked using progress identifiers.

20. The non-transitory machine readable medium of claim 18, wherein progress of the switchover sequence is tracked using generation numbers.

* * * * *